United States Patent
Bora et al.

(10) Patent No.: US 11,713,040 B2
(45) Date of Patent: Aug. 1, 2023

(54) METHOD FOR CONTROLLING BRAKING OF A VEHICLE

(71) Applicant: VOLVO TRUCK CORPORATION, Gothenburg (SE)

(72) Inventors: Teodoro Bora, Gothenburg (SE); Johan Fries, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 22 days.

(21) Appl. No.: 17/595,547

(22) PCT Filed: May 21, 2019

(86) PCT No.: PCT/EP2019/063102
§ 371 (c)(1),
(2) Date: Nov. 18, 2021

(87) PCT Pub. No.: WO2020/233795
PCT Pub. Date: Nov. 26, 2020

(65) Prior Publication Data
US 2022/0212664 A1  Jul. 7, 2022

(51) Int. Cl.
*B60W 30/18* (2012.01)
*B60W 30/14* (2006.01)
(Continued)

(52) U.S. Cl.
CPC .......... *B60W 30/143* (2013.01); *B60W 10/06* (2013.01); *B60W 10/196* (2013.01);
(Continued)

(58) Field of Classification Search
CPC .... B60W 10/06; B60W 10/196; B60W 10/11; B60W 30/143; B60W 30/18136;
(Continued)

(56) References Cited

U.S. PATENT DOCUMENTS 10,843,680 B2 * 11/2020 Peterson ............... B60W 20/12
2009/0150035 A1 6/2009 Soliman et al.
(Continued)

FOREIGN PATENT DOCUMENTS

WO 2006107267 A1 10/2006
WO 2008077351 A1 7/2008
(Continued)

OTHER PUBLICATIONS

International Search Report and Written Opinion dated Nov. 8, 2019 in corresponding International PCT Application No. PCT/EP2019/063102, 9 pages.
(Continued)

*Primary Examiner* — Edwin A Young
(74) *Attorney, Agent, or Firm* — Venable LLP; Jeffri A Kaminski (57) ABSTRACT

The invention provides a method for controlling braking of a vehicle (1) driving along a downhill portion of a road, the vehicle comprising a propulsion arrangement (2, 3), for the propulsion of the vehicle, the method comprising dividing the road portion into a plurality of sections (RS0-RS2), the sections comprising a first section (RS1), and a second section (RS2) following, in the direction of travel of the vehicle, immediately upon the first section (RS1), determining, for the road portion, a road portion control strategy, with a condition that braking on the road portion is done at least partly by means of the propulsion arrangement (2, 3), wherein determining the road portion control strategy comprises determining a speed (SD21), on the second section (RS2), with an aim to minimize the time travelled on the second section, and/or, where the propulsion arrangement comprises an internal combustion engine (2), and a gearbox (3), determining a gear selection (GS2) on the second section (RS2), with an aim to minimize the time travelled on
(Continued)

the second section, and wherein determining the road portion control strategy comprises determining, for the first section (RS1), a first section control strategy, with an aim to minimize the time travelled on the first section, and with an aim to provide a vehicle speed at the end of the first section (RS1) which is the same as said determined speed (SD21) on the second section (RS2), and/or to provide a gear selection at the end of the first section which is the same as said determined gear selection (GS2) on the second section (RS2), the method further comprising controlling the vehicle (1) according to the determined road portion control strategy.

20 Claims, 4 Drawing Sheets

(51) Int. Cl.
*B60W 10/06* (2006.01)
*B60W 10/196* (2012.01)
*B60W 50/00* (2006.01)
*F16H 59/66* (2006.01)

(52) U.S. Cl.
CPC .. *B60W 30/18136* (2013.01); *B60W 50/0097* (2013.01); *B60T 2201/04* (2013.01); *B60W 2030/18081* (2013.01); *B60W 2510/068* (2013.01); *B60W 2552/15* (2020.02); *B60W 2710/06* (2013.01); *B60W 2710/1005* (2013.01); *B60W 2710/18* (2013.01); *B60W 2720/10* (2013.01); *F16H 2059/663* (2013.01)

(58) Field of Classification Search
CPC ......... B60W 50/0097; B60W 2552/15; B60W 2030/18081; B60W 2510/068; B60W 2710/06; B60W 2710/1005; B60W 2710/18; B60W 2720/10; B60T 2201/04; F16H 2059/663
See application file for complete search history.

(56) References Cited

U.S. PATENT DOCUMENTS

| 2017/0028980 A1* | 2/2017 | Ogawa ................. B60W 20/12 |
| 2018/0023692 A1 | 1/2018 | Gauthier |
| 2018/0265090 A1 | 9/2018 | Sharma et al. |
| 2018/0334973 A1* | 11/2018 | Hirschmann ......... B60W 50/14 |
| 2019/0001984 A1 | 1/2019 | Huh et al. |

FOREIGN PATENT DOCUMENTS

| WO | 2015178838 A1 | 11/2015 |
| WO | 2017221233 A1 | 12/2017 |

OTHER PUBLICATIONS

European Office Action dated Oct. 4, 2022 in corresponding European Patent Application No. 19725987.2, 6 pages.

* cited by examiner

METHOD FOR CONTROLLING BRAKING OF A VEHICLE

CROSS-REFERENCE TO RELATED APPLICATIONS

This application is a U.S. National Stage application of PCT/EP2019/063102, filed May 21, 2019, and published on Nov. 26, 2020, as WO 2020/233795 A1, all of which is hereby incorporated by reference in its entirety.

TECHNICAL FIELD

The invention relates to a method for controlling braking of a vehicle. The invention also relates to a computer program, a computer readable medium, a control unit, and a vehicle.

The invention can be applied in heavy-duty vehicles, such as road trucks, quarry trucks, mining trucks, and buses. The invention is not restricted to heavy-duty vehicles, but may also be used for other vehicles such as cars.

BACKGROUND

The proper usage of an engine braking function is fundamentally important for heavy-duty vehicles in order to safely drive along a downhill road stretch, or along a sequence of downhill road stretches. A reason is that excessive, or inappropriate use of the service brakes, can heat up and vitrify the service brakes, which may then eventually lose their functionality.

US2018023692 discloses an automatic transmission shift control system in which an electronic control unit is configured to determine, by means of a navigation unit, a current route having a plurality of segments, and to determine a shift schedule that includes a respective transmission shift command for a respective of the segments. The shift schedule may be based on a grade level for the respective segment. The adaptive shift control may shift to a lower gear when traveling downhill to increase engine braking.

However, there is a desire to improve the control of braking of a vehicle driving along a downhill portion of a road. In particular, there is a desire to provide a safe way to control a vehicle driving along a downhill portion of a road, while minimizing the time travelled along the road portion.

SUMMARY

An object of the invention is to provide a safe way to control a vehicle driving along a downhill portion of a road, while minimizing the time travelled along the road portion.

The object is reached with a method. Thus, the object is reached with a method for controlling braking of a vehicle driving along a downhill portion of a road, the vehicle comprising a propulsion arrangement, for the propulsion of the vehicle, the method comprising.

dividing the road portion into a plurality of sections, the sections comprising a first section, and a second section following, in the direction of travel of the vehicle, immediately upon the first section, determining, for the road portion, a road portion control strategy, with a condition that braking on the road portion is done at least partly by means of the propulsion arrangement, wherein determining the road portion control strategy comprises determining a speed, on the second section, with an aim to minimize the time travelled on the second section, and/or, where the propulsion arrangement comprises an internal combustion engine, and a gearbox, determining a gear selection on the second section, with an aim to minimize the time travelled on the second section, and wherein determining the road portion control strategy comprises determining, for the first section, a first section control strategy, with an aim to minimize the time travelled on the first section, and with an aim to provide a vehicle speed at the end of the first section which is the same as said determined speed on the second section, and/or to provide a gear selection at the end of the first section which is the same as said determined gear selection on the second section, the method further comprising controlling the vehicle according to the determined road portion control strategy.

The road portion may involve a stretch of downhill segments. The control strategy may be calculated for the vehicle, for the road portion.

Thus, the method comprises determining a speed on the second section, and/or, where the propulsion arrangement comprises an internal combustion engine, and a gearbox, determining a gear selection on the second section. Embodiments of the invention may comprise determining the first section control strategy with an aim to provide a vehicle speed at the end of the first section which is the same as said determined speed on the second section, and to provide a gear selection at the end of the first section which is the same as said determined gear selection on the second section. The first section control strategy determination may comprise determining, for the first section, a first section gear selection strategy, with the aim to provide a gear selection at the end of the first section which is the same as said determined gear selection on the second section.

As suggested below, the invention is applicable to vehicles without a gearbox. In such embodiments, the method does not comprise determining a gear selection on the second section, and determining the first section control strategy with an aim to provide a gear selection at the end of the first section which is the same as said determined gear selection on the second section. However, in some embodiments, where the method comprises determining a gear selection on the second section, and determining the first section control strategy with an aim to provide a gear selection at the end of the first section which is the same as said determined gear selection on the second section, the method does not comprise determining the first section control strategy with an aim to provide a speed at the end of the first section which is the same as a determined speed on the second section.

The determined speed on the second section may occur at least at an entry to the second section. Similarly, the determined gear selection on the second section may occur at least at an entry to the second section. Determining the speed on the second section may involve optimizing the speed. Similarly, determining the gear selection on the second section may involve optimizing the gear selection. The aim to minimize the time travelled on the second section, may be provided as a condition in the determination of the speed on the second section, and/or as a condition in the determination of the gear selection on the second section. One or more further conditions may be provided in the determination of the speed on the second section, and/or in the determination of the gear selection on the second section. In other words, the speed, and/or the gear selection, on the second section may be determined with one or more additional aims. Such an additional aim could be to avoid a speed at which the vehicle cannot be controlled so as to keep the speed constant. Another additional aim could be to not exceed a legal speed limit in the second section. A further aim could be to not exceed a speed limit provided by a curve in the second section. Yet another aim could be to not exceed a speed limit imposed by an obstacle in the second section.

Similarly, the aim to minimize the time travelled on the first section, may be provided as a condition in the determination of the first section control strategy. Further, the aim to provide a vehicle speed at the end of the first section which is the same as said determined speed on the second section, may be provided as a condition in the determination of the first section control strategy. The aim to provide a gear selection at the end of the first section which is the same as said determined gear selection on the second section, may be provided as a condition in the determination of the first section control strategy. One or more further conditions may be provided in the determination of the first section control strategy. In other words, the first section control strategy may be determined with one or more additional aims. Such an additional aim could be to avoid speeds at which the vehicle cannot be controlled so as to keep the speed constant. Another additional aim could be to not exceed a legal speed limit in the first section. A further aim could be to not exceed a speed limit provided by a curve in the first section. Yet another aim could be to not exceed a speed limit imposed by an obstacle in the first section.

The condition that braking on the road portion is done at least partly by means of the propulsion arrangement, allows a minimum, or no, use of the vehicle service brakes. The service brakes may be friction-based. Minimizing the use of service brakes will provide a safe way to control a vehicle driving along the downhill road portion. Further, the method provides a first section control strategy that allows the vehicle to travel the first section in the shortest possible time, while entering the second section at a speed which is optimized for the second section. Thereby, an element of "planning ahead" is introduced, so as to avoid the need for service brake use in the second section. Thereby, a balance between minimum travelling time, and minimum service brake wear, is provided.

The method may involve automatically controlling the braking of the vehicle. However, the method is also applicable to non-autonomous cases. In some embodiments it could be used as a driver assistance method, to advice the driver on controlling the braking of the vehicle. Such advice could be given, e.g. by means of visual or audio information delivering means.

Preferably, the speed, on the second section, is determined before the first section control strategy is determined. Thereby, the first section control strategy may minimize the time travelled on the first section, and provide a speed at the end of the first section which is the same as said determined speed on the second section. Thus, as seen in the direction of travel of the vehicle, a backwards determination of speeds in the sections may be provided. This may simplify the determination of the road portion control strategy, since no iteration, or recalculation of the second section speed is needed. Once the second section speed has been determined, the first section control strategy may be determined such that when entering the second section, the vehicle is at the speed determined for the second section.

Preferably, the first section has a constant declination. Thereby, a simplification of the first section control strategy determination may be provided. In some embodiments, a plurality of the sections have respective constant declinations. In some embodiments, alternatively, or in addition, the division of the road portion into sections may be done according to one or more alternative or additional criteria. For instance, where there is a curve, or an obstacle, e.g. in the form of another vehicle, a segment could be formed along a stretch of the road portion including the curve or obstacle. Further, dividing the road portion into a plurality of sections may be done in dependence of environmental conditions, such as traffic intensity, road conditions, and/or environmental conditions.

Where the vehicle comprises service brakes, determining the road portion control strategy may be done with the condition of avoiding the use of the service brakes on the road portion. Thereby, a particularly low service brake wear may be provided, balanced with a minimization of the time travelled along the road portion.

It should be noted that the method may be carried out where the vehicle comprises a retarder. The retarder may be, for example, a hydraulic retarder, or an electric retarder. A hydraulic retarder uses viscous drag forces between dynamic and static vanes in a fluid-filled chamber to achieve retardation. Electric retarders use electromagnetic induction to provide a retardation force. The use of the retarder, in addition to the propulsion arrangement braking, may allow higher speeds, compared to the propulsion arrangement braking only. In some embodiments, the road portion control strategy may be determined with a condition that braking on the road portion is done by means of the propulsion arrangement, and the retarder. Thereby, a balance between minimum travelling time, and minimum service brake wear, may be provided. In other embodiments, the road portion control strategy may be determined with a condition of avoiding the use of the retarder on the road portion. In some embodiments, the road portion control strategy may be determined with a condition that braking on the road portion is done by means of the propulsion arrangement only.

Preferably, determining the road portion control strategy comprises determining, for the second section, a second section control strategy, the second section control strategy determination comprising the determination of the second section speed. Thereby, the second section control strategy is preferably determined before the determination of the first section control strategy. Thus, as seen in the direction of travel of the vehicle, a backwards determination of control strategies for the sections may be provided. This may simplify the determination of the road portion control strategy, since no iteration, or recalculation of the second section control strategy is needed. Once the second section control strategy has been determined, the first section control strategy may be determined such that when entering the second section, the vehicle is at the speed determined for the second section.

Preferably, determining the second section control strategy determination comprises determining, for the second section, a second section speed profile. Thereby, said determined speed on the second section may occur at a plurality of positions within the first 10%, preferably the first 30%, more preferably the first 50%, of the second section. Thereby, said speed on the second section, determined with the aim to minimize the time travelled on the second section, may be provided along an initial part of the second section. Thereby, the speed may be constant along an initial part of the second section. Keeping this optimized speed for a part of the second section will assist in minimizing the time travelled on the second section. In relatively long sections, the speed may be kept constant throughout a relatively long part of the section. It should be noted though that in other sections, e.g. in relatively short sections, the speed may vary throughout the entire section.

Preferably, the control strategy on the first section, and/or said speed on the second section, is determined at least partly based on data indicative of the maximum available braking force, as a function of the vehicle speed. Thereby, it can be secured that the braking force will be able to prevent the vehicle speed from increasing uncontrollably. Each section may have its optimal speed and gear selection. Such a selection may be obtained using a vehicle model, and the data indicative of the maximum available braking force, as a function of the vehicle speed. As stated, in a road section, the vehicle may be controlled so as to have the optimal speed and gear at the entrance of the following section. In some embodiments, the entry speed and exit speed for each section may be decided by using the vehicle model, and the data indicative of the maximum available braking force, as a function of the vehicle speed. Thereby, preferably, only the intermediate speeds are optimized by the repeated calculations.

Preferably, determining the first section control strategy comprises determining, for the first section, a first section speed profile. Thereby, said aims in the determination of the first section control strategy may be reached in a relatively simple manner. Preferably, the determination of the first section speed profile is done subsequently to the second section speed determination. Alternatives to such embodiments are possible. As exemplified herein, in some embodiments, the determination of the first section control strategy comprises determining, for the first section, a first section gear selection strategy.

Where the second section has a lower declination than the first section, the first section speed profile may have increasing speeds at the end of the first section. Thus, the integral of speeds may be increased, e.g. when the current road section is a steeper downhill section than the subsequent section, with a lower optimal speed than that of the subsequent section. I.e., at some distance before the boundary between the sections, the speed may be allowed to increase, so as to reach the optimal speed for the subsequent section when it is entered. Thereby, the time travelled through the first section, as well as the time travelled through the second section, may be decreased.

Where the second section has a higher declination than the first section, the first section speed profile may have decreasing speeds at the end of the first section. Thus, when the subsequent section is steeper than the preceding section, an excessive speed, resulting in the need to use the service brakes, may be avoided. This reduces service brake wear.

Preferably, where the propulsion arrangement comprises an internal combustion engine, and a gearbox, the gear selection, on the second section, is determined before the first section control strategy is determined. Thereby, the first section control strategy may minimize the time travelled on the first section, and provide a gear selection at the end of the first section which is the same as said determined gear selection on the second section. Thus, as seen in the direction of travel of the vehicle, a backwards determination of gear selections in the sections may be provided. This may simplify the determination of the road portion control strategy, since no iteration, or recalculation of the second section gear selection is needed. Once the second section gear selection has been determined, the first section control strategy may be determined such that when entering the second section, the vehicle is in the gear determined for the second section.

Determining the road portion control strategy may comprise determining, for the second section, a second section control strategy, the second section control strategy determination comprising the determination of the second section speed, and the determination of the second section gear selection. Thereby, the second section control strategy may comprise determining, for the second section, a second section gear selection strategy. Thereby, each section of the road portion may advantageously be provided with an optimized speed profile, and an optimized gear selection strategy.

The gear selection on the second section, may be determined with an aim to minimise the time travelled on the second section. Embodiments of the invention may comprise optimizing a speed profile and a gear selection strategy in each road section. This may provide a maximum speed integral, taking into account the adaption, in a section, of the speed and gear selection, to the speed and gear selection optimized for the next section. In other words, a control may be provided, with a speed and gear selection in a section, allowing the vehicle to travel the section in the shortest possible time, and so as to obtain, at the entry of the next section, a speed and gear which are optimized for that next section.

Thus, embodiments of the invention provide for a prediction of the best vehicle speed and gear combination for successive sections of a road portion. Embodiments of the invention includes a backwards calculation, i.e. the entry speed and gear selection of a section are back propagated and used as an exit speed and an exit gear selection in a preceding section. Thereby, in the optimization of a speed profile and gear selection strategy for a section, the final speed and gear selection is given as a result of a previous optimization of the speed profile and gear selection for the following road section. It should be noted that the speed and gear selection for the following section could be given by a restriction, e.g. due to a curve, or an obstacle, such as another vehicle, in the following section.

Embodiments of the invention allows for keeping the speed as high as possible, while keeping allowing, without compromising safety, any disturbance, such as a change in inclination, an engine de-rate, a gear shift, etc. Such embodiments will prevent an increase of the vehicle kinetic energy, due to such a disturbance, to a point where an engine brake does not have more power to recover the situation. As a result, unnecessary gear upshifts, and service brake usage may be avoided. The gear selection strategy may reduce the number of gear shifts. This is beneficial since gear shifts may themselves cause an increase in the vehicle speed. Thus, keeping the number of gear shifts relatively low, may provide a control over all segments which is particularly efficient. Thus, embodiments of the invention may allow going downhill safely, but still in the most efficient way, i.e. as quick as possible without the need to use service brakes.

Preferably, the gear selection strategy on the first section, and/or the gear selection on the second section is determined at least partly based on data indicative of the maximum available braking force for each gear, as a function of the vehicle speed. Thereby, a maximized speed integral, without the need for any service gear usage, is further secured.

Preferably, the method comprises determining a strategy for a setting, on the first section, and/or a setting, on the second section, of a device for controlling an engine braking force of the engine. This will facilitate controlling the required engine braking force for the first and/or second sections. This may be particularly advantageous when the required engine braking force is below the maximum braking engine force for a selected gear, but above the maximum engine braking force for another gear which is immediately higher that the selected gear. The engine braking force control device may be provided in any suitable form. For example, the engine braking force control device may comprise an exhaust flow restriction element. Such an element may be arranged to controllably restrict the flow through an exhaust guide of the engine.

It should be noted that the invention is applicable also to vehicles where the propulsion arrangement does not comprise a gearbox. For example, the vehicle could be an electric vehicle, or a vehicle with a serial electric hybrid propulsion arrangement. In such vehicles, the propulsion arrangement may be used for regenerative braking of the vehicle. Thereby, embodiments of the invention may be used to find a speed profile of the vehicle which minimizes the time travelled through the road portion, while ensuring that the speeds at the ends of the road sections are such that they are optimized for the respective following road sections.

Preferably, where the propulsion arrangement comprises an internal combustion engine, the first section control strategy, the second section speed, and/or the second section gear selection, is determined in dependence on an engine exhaust temperature, and/or a de-rating of the engine in dependence on the exhaust temperature. As suggested above, such a temperature, or such a derating, may cause disturbances, which may increase the kinetic energy of the vehicle. By determining the first section control strategy, the second section speed, and/or the second section gear selection, in dependence on such a temperature, or such a derating, such a kinetic energy increase may be avoided.

Preferably, determining the first section control strategy comprises determining a plurality of speed profile candidates, and selecting, for the first section, a first section speed profile, from the profile candidates. Such a candidate determination and selection may advantageously form a part of an optimization of the first section control strategy. The candidate determination may be provided in the form of a candidate generation. The plurality of speed profile candidates for the first section may be randomly generated. In some embodiments, a plurality of candidates are selected from the determined plurality of candidates. The selected speed profiles could be such that they provide the highest speed integrals. Based on such a selected sub-group of speed profiles, a further set of speed profiles may be generated. Another selection may be made from the speed profiles in the further set. A plurality of such iterations may be provided. This may result in a particularly well optimized first section control strategy.

The speed profile candidates may each include a respective intermediate speed at a position between the start and the end of the first section, the intermediate speed being different from one profile candidate to another. In some embodiments, the speed profile candidates may each include a plurality of intermediate speeds, at respective positions between the start and the end of the first section.

Preferably, determining the first section control strategy comprises determining, for the first section, a first section speed profile. Thereby, where the sections comprise a preceding section, preceding, in the direction of travel of the vehicle, immediately before the first section, determining the road portion control strategy may comprise determining, for the preceding section, a preceding section control strategy, with an aim to minimize the time travelled on the preceding section, and to provide a vehicle speed at the end of the preceding section which is the same as a speed of the first section speed profile. This speed of the first section speed profile, preferably occurs at one or more positions within the first 10%, preferably the first 30%, more preferably the first 50%, of the first section. Said speed of the first section speed profile may occur at the entry of the first section. Thereby, a backwards determination of section control strategies along the road portion may be provided. This may provide a relatively simple calculation of the read portion control strategy. Further, it may be secured that each section control strategy provides a minimal travel time through the respective section, while securing that the speed at the entry of the next section is optimized for that section.

The object is also reached with a computer program, a computer readable medium, a control unit, or a vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
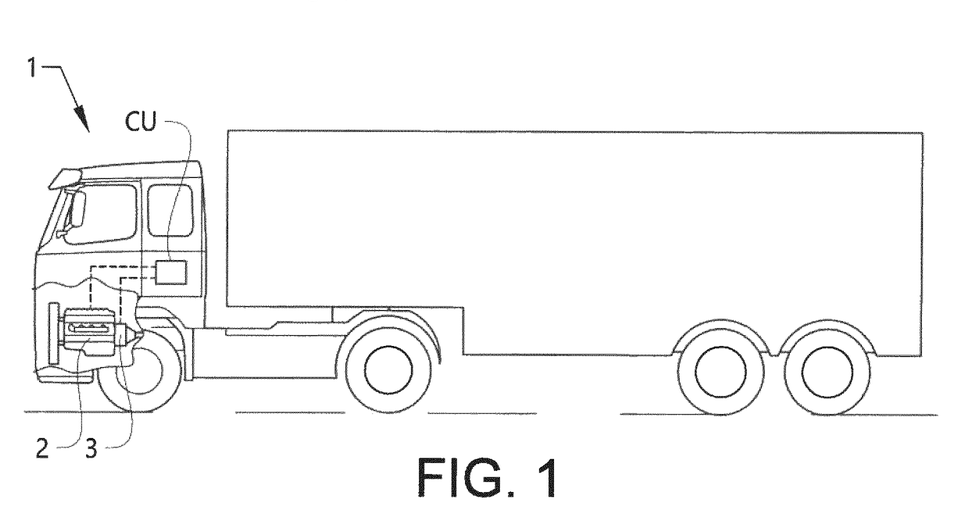
FIG. 1 shows a vehicle in the form of a truck.

FIG. 1 depicts a heavy-duty vehicle 1 in the form of a truck. The vehicle comprises a drivetrain. The drivetrain comprises a propulsion arrangement 2, 3, for the propulsion of the vehicle. The propulsion arrangement comprises an internal combustion engine 2, and a gearbox 3. The gearbox is in this embodiment an automatic transmission. The gearbox has in this example twelve gears, but a different number of gears is of course possible. A control unit CU is provided to control the engine 2 and the gearbox 3. It is understood that the control unit CU may be provided as a single physical unit, or as a plurality of physical units. The vehicle further comprises service brakes, (not shown).

Figure 2:
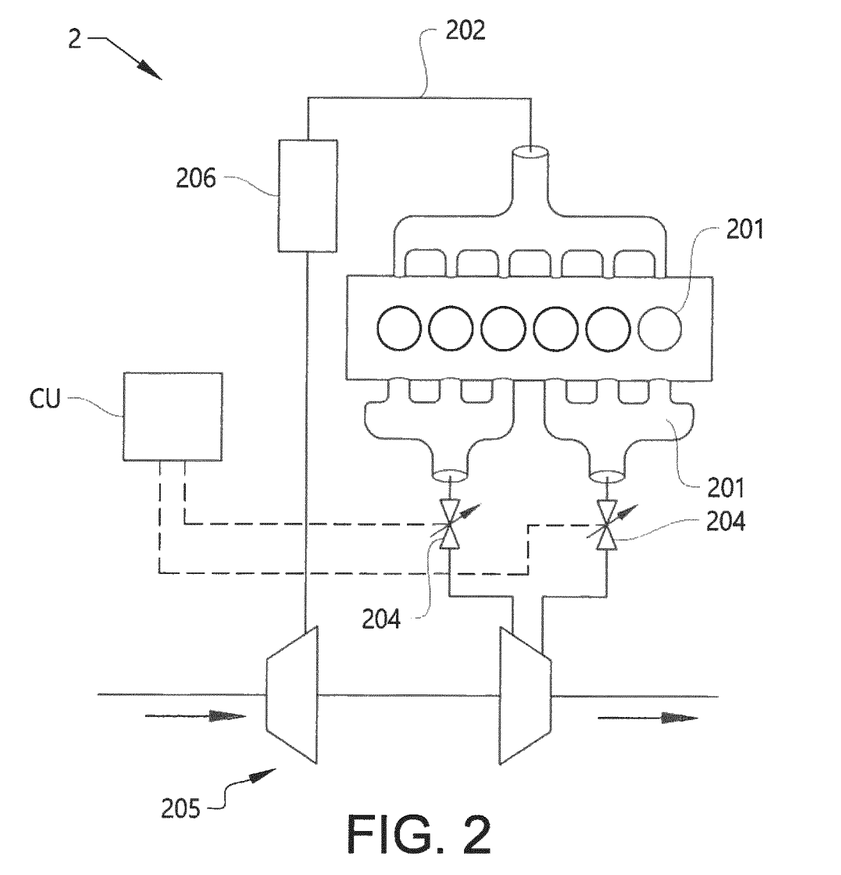
FIG. 2 depicts parts of an engine of the vehicle in FIG. 1.

As can be seen in FIG. 2, the engine in this example comprises six cylinders arranged in a line. In this example the engine is a diesel engine. However, the invention is equally applicable to other types of engines, such as Otto engines.

The engine comprises a turbocharger 205, an air guide 202 with a charge air cooler 206, and a fuel system (not shown). The exhaust conduit arrangement comprises two exhaust guides 203, each arranged to guide a gas flow from a respective group of the cylinders, to a turbine of the turbocharger 205. In each exhaust guide, an adjustable exhaust flow restriction element 204 is provided, in the form of an exhaust throttle valve. The exhaust flow restriction elements 204 are controllable by the control unit CU. Each of the flow restriction elements 204 is arranged to provide a plurality of levels of the exhaust flow restriction depending on the adjustment by the control unit CU of the respective exhaust flow restriction element 204.

The control unit CU is arranged to determine a requested engine braking torque. The control unit CU is further arranged to control an actual engine braking torque, towards the requested engine braking torque, by means of the exhaust flow restriction elements 204. For this control, the control unit CU obtains values of the engine rotational speed, which may be determined by means of an engine speed sensor. The control unit CU may be provided with stored data correlating values of the engine torque and the engine rotational speed with settings for the exhaust flow restriction elements 204. Further input parameters in the engine break control may be the pressure in the exhaust guides, and/or the air flow in the air guide 202, determined e.g. by means of an air flow sensor (not shown). Further, for the engine brake control, the control unit CU may be arranged to access stored data correlating values of the engine torque and the engine rotational speed with desired values of the air guide pressure.

Alternatively, a single exhaust guide, with a single exhaust flow restriction element 204, may be arranged to guide exhaust gases from all cylinders of the engine. In some embodiments, an exhaust flow restriction element 204 may be provided downstream of the turbine of the turbocharger 205. In further embodiments, the engine braking torque may be controlled by means of a variable geometry turbocharger.

Figure 3:
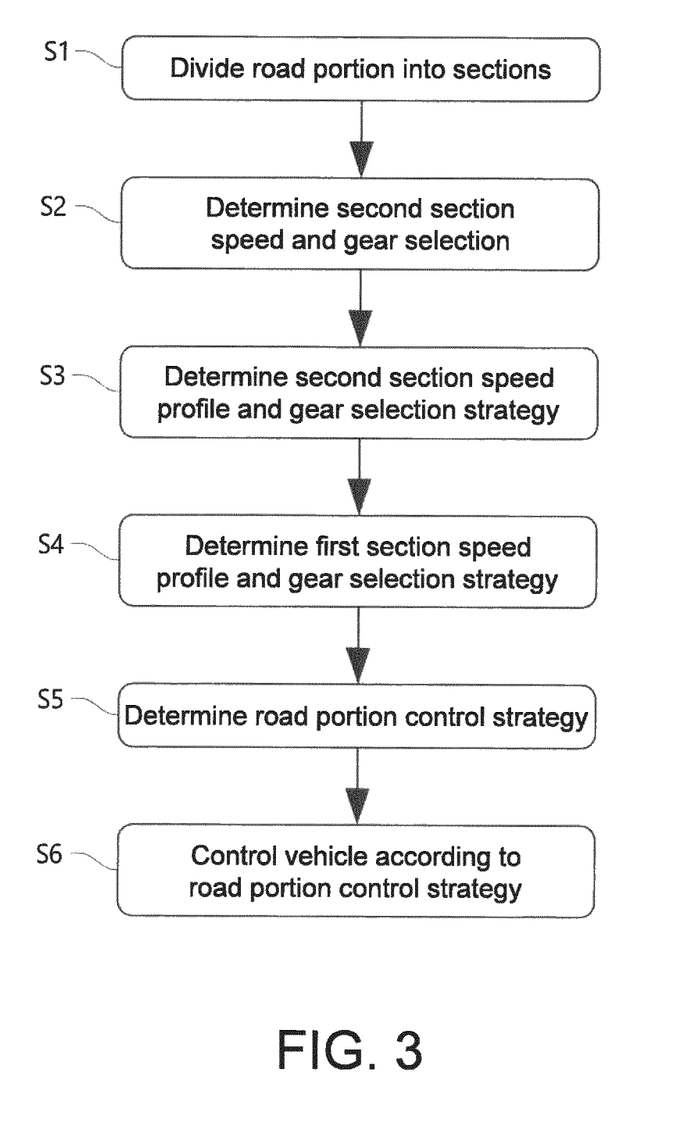
FIG. 3 is a flow diagram depicting stages in a method according to an embodiment of the invention.

FIG. 3. depicts steps in a method, according to an embodiment of the invention, for controlling engine braking of a vehicle 1 driving along a downhill portion of a road.

Figure 4A:
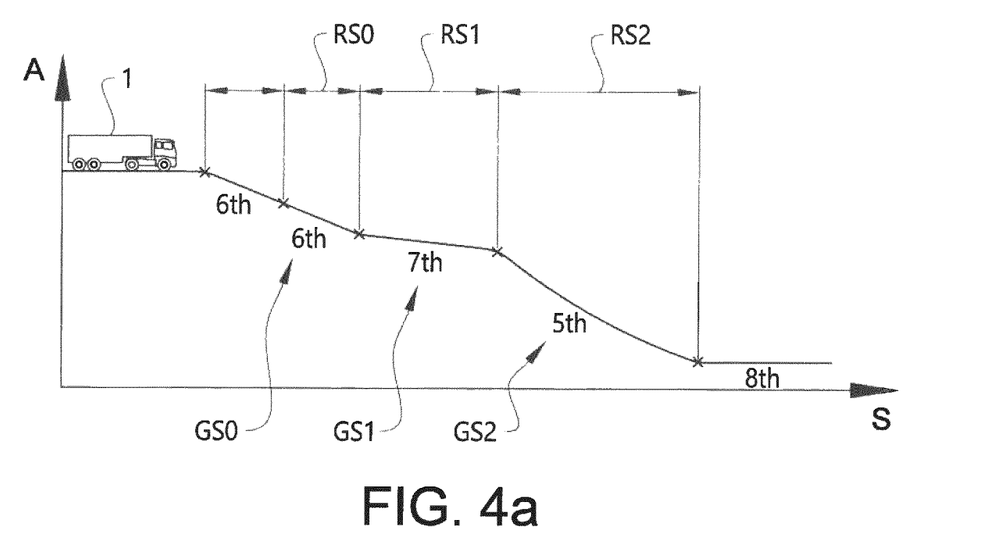
FIG. 4a shows a schematic vertical cross-section along a route travelled by the vehicle in FIG. 1, with the altitude a as a function of the horizontal distance travelled s.

Reference is made also to FIG. 4a. The method comprises dividing S1 the road portion into a plurality of sections RS0-RS2. The sections comprise what is referred to herein as a first section RS1, and a second section RS2 following, in the direction of travel of the vehicle, immediately upon the first section RS1. The division of the road portion is made such that each section RS0-RS2 has a substantially constant declination. Thus, stretches forming a transition between two road inclinations, form divisions between adjacent sections RS0-RS2. Further, the division of the road portion is made so that curves, entailing a vehicle speed restriction, also form divisions between adjacent sections. The road portion division may be done at least partly based on map data.

Figure 4B:
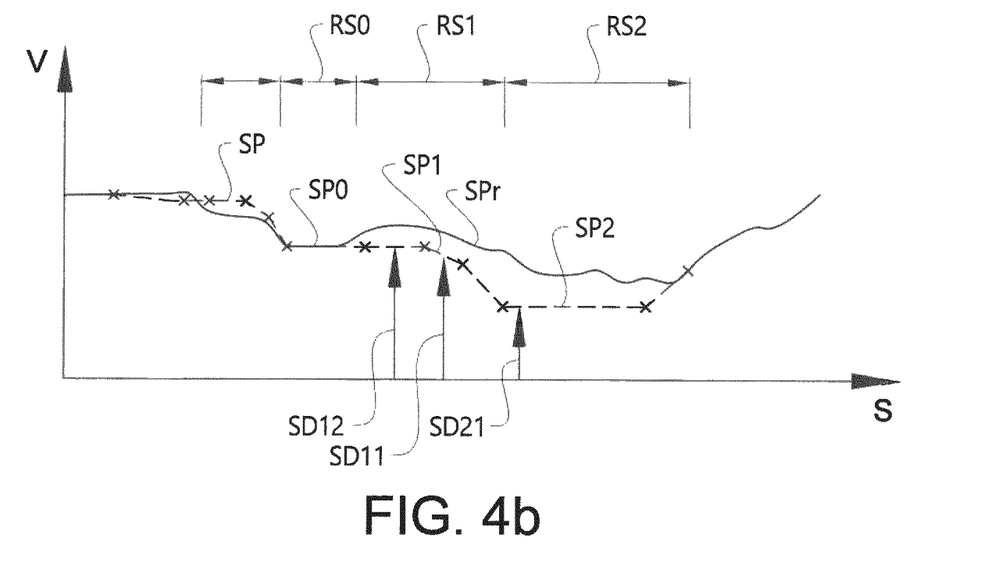
FIG. 4b shows a reference speed profile, and a determined speed profile for the vehicle in FIG. 1, with the vehicle speed v as a function of the horizontal distance travelled s.

Reference is made also to FIG. 4b. The method may further comprise obtaining a reference speed profile SPr for the road portion. The reference speed profile SPr may be a stored speed profile. The reference speed profile SPr may have recorded during a previous travel of the vehicle 1, or another vehicle, on the road portion.

The method further comprises determining, for the road portion, a road portion control strategy. The road portion control strategy is determined with a condition that braking on the road portion is done by means of the propulsion arrangement 2, 3 only. Thus, determining the road portion control strategy is done with the condition of avoiding the use of the vehicle service brakes on the road portion. As suggested above, in some embodiments, where the vehicle comprises a retarder, the road portion control strategy may be determined with a condition that braking on the road portion is done by means of the propulsion arrangement, and the retarder only.

The road portion control strategy is determined with a calculation that is opposite to the vehicle travel direction. Thus, a speed profile for a road section RS1 is determined partly based on a previously determined speed profile for a road section RS2 following immediately after the road section RS1, for which a speed profile is to be determined.

Thus, the road portion control strategy determination comprises determining S3, for the second section RS2, a speed profile, referred to herein as a second section speed profile. Determining the second section speed profile comprises S2 determining a speed SD21, on the second section RS2, with an aim to minimize the time travelled on the second section. Thus, the determined speed SD21 is the highest speed that the vehicle engine brake allows in the second section. Similarly to what will be described below regarding the first section, the second section speed profile is adapted to a speed for the following, third section. Thereby, an end portion of the second section RS2 will have a speed profile, which gradually adjusts, from the highest allowed speed SD21, to said third section speed. Thus, an initial part of the second section will have constant speed profile with the highest allowed speed SD21. In this example, said highest allowed speed SD21 on the second section occurs at all positions within the first 75% of the second section RS2.

The road portion control strategy determination further comprises determining S3, for the second section RS2, a gear selection strategy, referred to herein as a second gear selection strategy. Determining the second gear selection strategy comprises determining a gear selection GS2 on the second section RS2. This is done similarly to how it is done for the first section RS1, as described below. In this example, as can be seen in FIG. 4a, the gear selection GS2 on the second section RS2 is the 5th gear.

Subsequently, a first section control strategy is determined S4 for the first section RS1, with an aim to minimize the time travelled on the first section, and to provide a vehicle speed at the end of the first section RS1 which is the same as said determined speed SD21 on the second section RS2. Determining the first section control strategy comprises determining, for the first section, a first section speed profile SP1. It should be noted that in some embodiments, the second section speed profile does not have to be determined before the first section speed profile SP1 is determined. In some embodiments, the first section speed profile SP1 may be determined upon merely determining said speed SD21 on the second section RS2.

Further, the first section control strategy determination comprises determining S4, for the first section RS1, a first section gear selection strategy, with an aim to provide a gear selection at the end of the first section which is the same as said determined gear selection GS2 on the second section RS2. It should be noted that in some embodiments, the second section gear selection strategy does not have to be determined before the first section gear selection strategy is determined. In some embodiments, the first section gear selection strategy may be determined upon merely determining said gear selection GS2 on the second section RS2.

The determinations of the first section speed profile SP1, and the first section gear selection strategy, are in this embodiment performed as follows:

Forces acting on the vehicle are determined. This could be done using a vehicle model. The vehicle model could be stored in the control unit CU. A force pulling the vehicle in the direction of travel is a component of gravity $\vec{F}_g(t)$ acting along the road, which component is dependent on the road declination. Opposite to the direction of travel there is a resistive force $\vec{F}_r(t)$, resisting the vehicle motion. The resistive force could be the result of a plurality of contributors, such as air drag, rolling resistance, driveline and engine frictions, etc. It is understood that the resistive force may be dependent on the vehicle speed. The effective force accelerating the vehicle downhill is the difference between said gravity component and the resistive force. In order to keep the vehicle speed constant, an engine braking force $\vec{F}_b(t)$ of the engine needs to be equal to said difference. This could be expressed as follows:

$$\vec{F}_g(t) + \vec{F}_r(t) + \vec{F}_b(t) = 0 \quad (1)$$

The braking force $\vec{F}_b(t)$ is dependent on the gear selection, as exemplified below. In addition, the braking force $\vec{F}_b(t)$ may be dependent on an engine oil temperature, limitations due to the road being slippery, the engine or output shaft speed, etc. The dependence on such operational circumstances may be included in the vehicle model.

Determining the first section speed profile SP1 may be achieved by minimizing a cost function. Minimizing the cost function may involve finding a first section speed profile SP1, which maximizes the integral of the speed profile, while avoiding the use of the service brakes. The integral of the speed profile SP1 is the area under the line SP1 in FIG. 4b. Thus, the integral may have the distance travelled s as an independent variable. It should be noted that such a cost function may be used without the involvement of the reference speed profile SPr.

Alternatively, the first section speed profile SP1 may be achieved by the minimization of the following cost function:

$$\min_{\phi_i, p_1, p_2} \left[ \int_{s=0}^{s_d} \Phi(s) ds - \int_{s=0}^{s_d} \phi(s \mid \phi_i, p_1, p_2) ds \right] \quad (2)$$

Where
$\phi_i$ is the entry (initial) speed on the first section RS1,
$\phi(\bullet)$, i.e. the function in the first integral, is the reference speed profile SPr on the first section RS1;
$\phi(\bullet)$, i.e. the function in the second integral, is the final (optimized) speed profile, i.e. the first section speed profile SP1,
$(p_1, p_2) \in \mathbb{R}^{2 \times 1}$ are cardinals pairs used to define a function of the first section speed profile SP1,
s is the distance travelled, i.e. an independent variable indicating the displacement within the first section.

Preferably, the cost function is solved by a numerical optimization method. In this embodiment, this optimization method comprises a stochastic/analytical hybrid algorithm with the following steps:

Based at least partly on the vehicle mass, and the declination of the first section RS1, the gravity component $\vec{F}_g(t)$, the resistive force $\vec{F}_r(t)$ are determined. The resistive force may be determined based on a speed of the reference speed profile. In some embodiments, the resistive force could be approximated as speed independent, e.g. by ignoring the air drag contribution. As follows from equation (1) above, the absolute value of the required engine braking force $\vec{F}_b(t)$ is equal to the sum of the gravity component $\vec{F}_g(t)$, and the resistive force $\vec{F}_r(t)$, (one being positive and the other negative).

Figure 5:
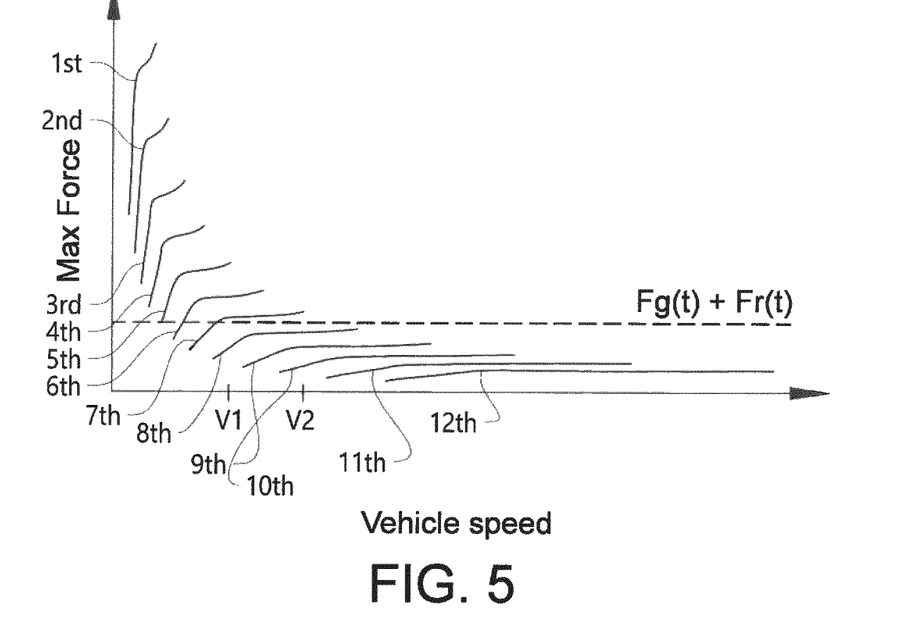
FIG. 5 shows a diagram indicating, for each gear of a gearbox of the vehicle in FIG. 1, the maximum available engine braking force, as a function of the vehicle speed.

Reference is made also to FIG. 5. Due to the declination being constant within the first section RS1, it is possible to find a constant gear and speed pair for the vehicle. The sum of the gravity component $\vec{F}_g(t)$, and the resistive force $\vec{F}_r(t)$ gives a value of the required engine braking force $\vec{F}_b(t)$ on the vertical axis in the diagram in FIG. 5. The diagram in FIG. 5 indicates, for each gear, the maximum available braking force, as a function of the vehicle speed. As can be seen increasing gears generally give a lower engine braking forces. As can be seen in the diagram, in this example, the highest gear, which will keep the vehicle at a constant speed in the first section RS1 is the $7^{th}$ gear. Thus, a gear selection GS1 on the first section RS1 is the $7^{th}$ gear.

Determining the first section speed profile comprises determining a speed SD12, on the first section RS1, with an aim to minimize the time travelled on the first section. the determined speed SD12 is the highest speed that the vehicle engine brake allows in the first section. In this example, as can be seen in FIG. 5, the maximum braking force for each gear is, at an upper speed interval of the full speed interval for the respective gear, essentially constant, or less increasing with the speed, compared to at a lower speed interval of the full speed interval for the respective gear. Said upper speed interval for the $7^{th}$ gear is indicated with the interval end values V1 and V2. In this embodiment, the highest allowed speed SD12 is selected to be within the upper speed interval V1-V2. The highest allowed speed SD12 may be at the upper end of the upper speed interval V1-V2.

As can be seen in FIG. 5, the required engine braking force is below the maximum braking force for the $7^{th}$ gear. To keep the required engine braking force, a setting, on the first section RS1, of the adjustable exhaust flow restriction element 204, is determined.

As understood, the determined first section highest allowed speed SD12, and the determined second section highest allowed speed SD21, are different. Also, the gear selection GS1 on the first section RS1 is not the same as the gear selection GS2 on the second section RS2. The speed profile of the first section is determined so as to provide a vehicle speed at the end of the first section RS1 which is the same as said highest allowed speed SD21 on the second section RS2. Thereby, the first section highest allowed speed SD12 becomes an initial speed on the first section.

Further, the gear selection strategy of the first section is determined so as to provide a gear selection at the end of the first section RS1 which is the same as the gear selection GS2 on the second section RS2. Therefore, the optimization method for the first section speed profile includes, as boundaries, the second section highest allowed speed SD21, and the second section gear selection GS2, at the end of the first section RS1.

The optimization method involves determining, or generating, a plurality of speed profile candidates for the first section RS1. Each speed profile candidate includes a respective intermediate speed SD11 at a position between the start and the end of the first section RS1. The intermediate speed SD11 is different from one profile candidate to another. For the first section, the first section speed profile SP1 is selected from the profile candidates. The criteria for this selection is to minimize the time travelled on the first section. Each speed profile candidate may be associated with a respective gear selection strategy. The optimization may take into account that a gear change will increase the speed of the vehicle. This may be taken into account for selecting between a gear strategy which changes from one gear to another via one or more intermediate gears, and a gear strategy which changes directly from the one gear to the other gear.

The optimization method may involve the use of CMA-ES (Covariance Matrix Adaptation Evolution Strategy). Alternatively, another strategy could be used for the optimization method, such as Cross-Entropy, or NSGA-II. The plurality of speed profile candidates for the first section RS1 may be randomly generated. The amount of generated speed profile candidates may be 50-200, e.g. 100. From the generated speed profiles, a sub-group is selected. The amount of speed profiles in the sub-group could form e.g. a quarter to half of the generated speed profiles. E.g. the amount of selected speed profiles could be 30. The selected speed profiles could be such that they provide the lowest values of the cost function mentioned above. In some embodiments, the selected speed profiles could be the speed profiles having the highest integral in the distance domain. Based on the selected sub-group of speed profiles, a further set of speed profiles is generated. Another selection is made from the speed profiles in the further set. The optimization method could involve a plurality of such iterations.

As can be seen in FIG. 4a, the second section RS2 has a higher declination than the first section RS1. As can be seen in FIG. 4b, the first section speed profile SP1 has decreasing speeds at the end of the first section RS1.

Subsequently, a control strategy for a preceding section RS0, preceding, in the direction of travel of the vehicle, immediately before the first section RS1, is determined. The preceding section control strategy is determined similarly to the first section control strategy, described above. Thus, the preceding section control strategy is determined with an aim to minimize the time travelled on the preceding section RS0, and to provide a vehicle speed at the end of the preceding section which is the same as said initial speed SD12 of the first section speed profile SP1.

As stated, the division of the road portion may be made so that curves, entailing vehicle speed restrictions, also form divisions between adjacent sections. Thus, a curve, dividing two adjacent sections, may have a speed restriction. Thereby, a preceding of the adjacent sections may obtain a speed profile, such that the speed at the end of the preceding section is the speed according to the speed restriction. Further, a following of the adjacent sections may obtain a speed profile, such that the speed at the start of the following section is the speed according to the speed restriction. Thereby, the speed profile may have increasing speeds, after the start of the following section, up to a highest allowed speed on the following section.

When the control strategies for all sections RS0-RS2 have been determined, they will together form S5 the control strategy for the entire road portion RS0-RS2. Thereupon, the vehicle 1 is controlled S6 according to the determined road portion control strategy.

Many modifications may be made with the scope of the invention. For example, one or more section control strategies may be determined in dependence on an engine exhaust temperature, and/or a de-rating of the engine in dependence on the exhaust temperature.

Alternative computations methods for the optimization method may be used, such as Evolutionary computation, Genetic Algorithms, Monte-Carlo, Tabu-Search, Neural networks, or Dynamic programing.

Figure 6:
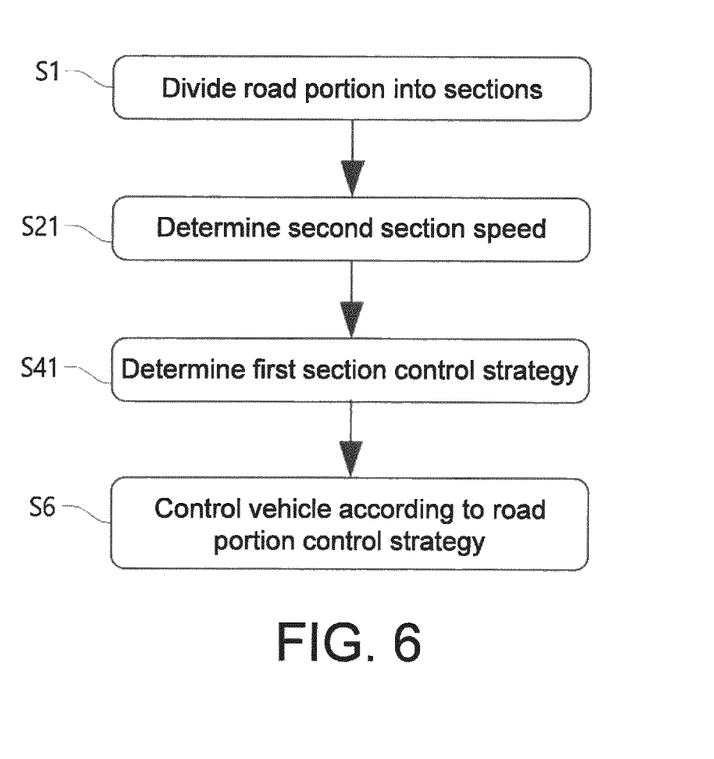
FIG. 6 is a flow diagram depicting stages in a method according to a more general embodiment of the invention.

FIG. 6 shows steps in a method, according to a more general embodiment of the invention, for controlling braking of a vehicle driving along a downhill portion of a road, the vehicle comprising a propulsion arrangement, for the propulsion of the vehicle. The method comprises dividing S1 the road portion into a plurality of sections, the sections comprising a first section, and a second section following, in the direction of travel of the vehicle, immediately upon the first section. The method further comprises determining, for the road portion, a road portion control strategy, with a condition that braking on the road portion is done by means of the propulsion arrangement. Determining the road portion control strategy comprises determining S21 a speed on the second section, with an aim to minimize the time travelled on the second section. Determining the road portion control strategy comprises determining S41, for the first section, a first section control strategy, with an aim to minimize the time travelled on the first section, and to provide a vehicle speed at the end of the first section which is the same as said determined speed on the second section. The method further comprising controlling S6 the vehicle according to the determined road portion control strategy.

It is to be understood that the present invention is not limited to the embodiments described above and illustrated in the drawings; rather, the skilled person will recognize that many changes and modifications may be made within the scope of the appended claims.

The invention claimed is:

1. A method for controlling braking of a vehicle driving along a downhill portion of a road, the vehicle comprising a propulsion arrangement, for the propulsion of the vehicle, the method comprising:
dividing the road portion into a plurality of sections, the sections comprising a first section, and a second section following, in a direction of travel of the vehicle, immediately upon the first section,
determining, for the road portion, a road portion control strategy, with a condition that braking on the road portion is done at least partly by means of the propulsion arrangement,
wherein determining the road portion control strategy comprises: determining a speed, on the second section, to minimize time travelled on the second section, and/or where the propulsion arrangement comprises an internal combustion engine, and a gearbox, determining a gear selection on the second section, to minimize the time travelled on the second section, and
wherein determining the road portion control strategy comprises determining, for the first section, a first section control strategy, to minimize the time travelled on the first section, and to provide a vehicle speed at an end of the first section which is the same as said determined speed on the second section, and/or to provide a gear selection at the end of the first section which is the same as said determined gear selection on the second section,
wherein the method further comprising controlling the vehicle according to the determined road portion control strategy.

2. The method according to claim 1, wherein the speed, on the second section, is determined before the first section control strategy is determined.

3. The method according to claim 1, wherein the first section control strategy minimizes the time travelled on the first section, and provides a speed at the end of the first section which is the same as said determined speed on the second section.

4. The method according to claim 1, wherein the first section has a constant declination.

5. The method according to claim 1, where the vehicle comprises service brakes, wherein determining the road portion control strategy is done with the condition of avoiding the use of the service brakes on the road portion.

6. The method according to claim 1, wherein determining the road portion control strategy comprises determining, for the second section, a second section control strategy, the second section control strategy determination comprising the determination of the second section speed.

7. The method according to claim 6, wherein the second section control strategy is determined before the determination of the first section control strategy.

8. The method according to claim 6, wherein determining the second section control strategy determination comprises determining, for the second section, a second section speed profile.

9. The method according to claim 8, wherein said determined speed on the second section occurs at a plurality of positions within the first 10% of the second section.

10. The method according to claim 1, wherein determining the first section control strategy comprises determining, for the first section, a first section speed profile.

11. The method according to claim 1, wherein the gear selection, on the second section, is determined before the first section control strategy is determined.

12. The method according to claim 11, wherein the gear selection strategy on the first section, and/or the gear selection on the second section is determined at least partly based on data indicative of the maximum available braking force for each gear, as a function of the vehicle speed.

13. The method according to claim 1, wherein determining the road portion control strategy comprises determining, for the second section, a second section control strategy, the second section control strategy determination comprising the determination of the second section speed, and the determination of the second section gear selection.

14. The method according to claim 1, wherein determining a strategy for a setting, on the first section, and/or a setting, on the second section, of a device for controlling an engine braking force of the engine.

15. The method according to claim 1, wherein the first section control strategy, the second section speed, and/or the second section gear selection, is determined in dependence on an engine exhaust temperature, and/or a de-rating of the engine in dependence on the exhaust temperature.

16. The method according to claim 1, wherein determining the first section control strategy comprises determining a plurality of speed profile candidates, and selecting, for the first section, a first section speed profile, from the profile candidates.

17. The method according to claim 1, wherein: determining the first section control strategy comprises determining, for the first section, a first section speed profile, wherein the sections comprise a preceding section, preceding, in the direction of travel of the vehicle, immediately before the first section, wherein determining the road portion control strategy comprises determining, for the preceding section, a preceding section control strategy, to minimize the time travelled on the preceding section, and to provide a vehicle speed at the end of the preceding section which is the same as a speed of the first section speed profile, occurring at one or more positions within the first 10% of the first section.

18. A computer program comprising program code for performing the method according to claim 1 when said program code is run on a computer, or a group of computers.

19. A control unit configured to perform the steps of the method according to claim 1.

20. A vehicle comprising a control unit according to claim 19.

* * * * *